S. P. McKINNY.
Plows.
No. 210,548. Patented Dec. 3, 1878.
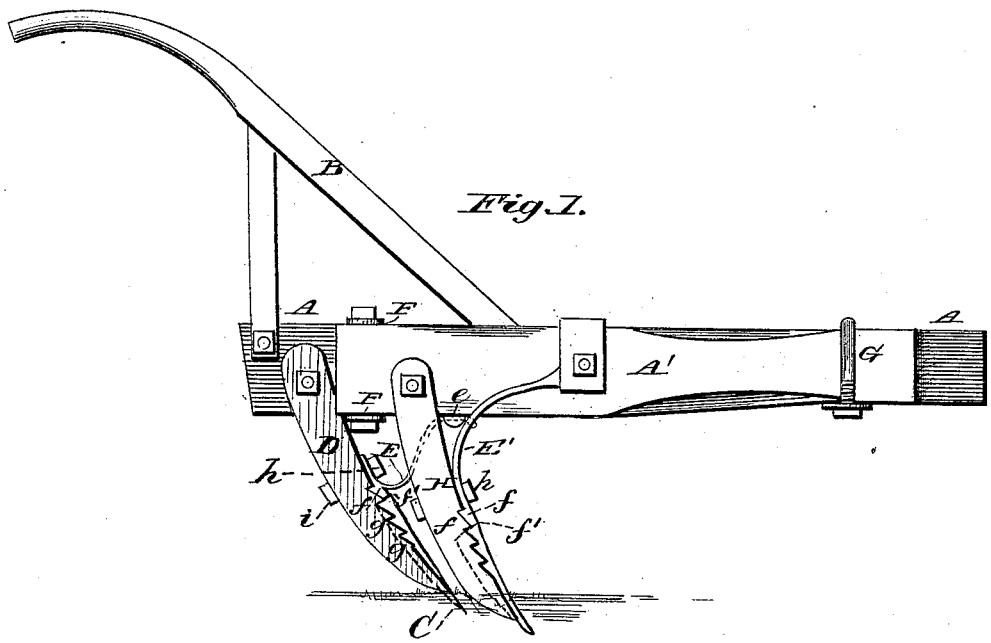
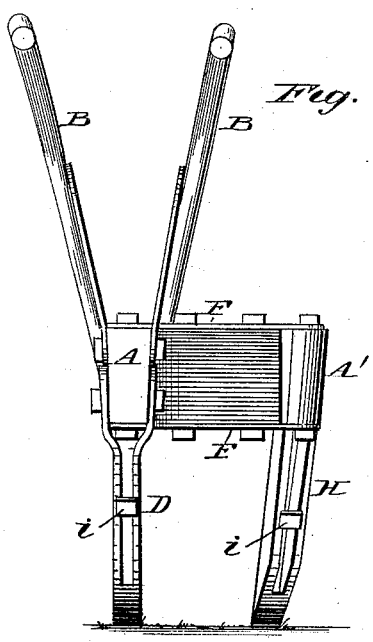
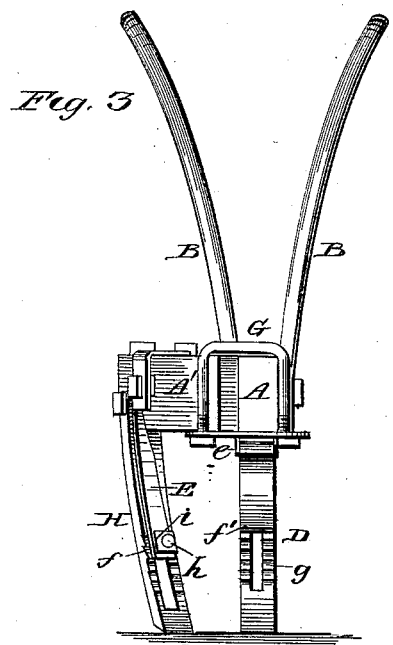
Witnesses
Fred G. Dieterich
George Binkenburg
Inventor
Stephen P. McKinny
by Louis Bagger & Co
his Attorneys

UNITED STATES PATENT OFFICE.

STEPHEN P. McKINNY, OF BARRETTSVILLE, GEORGIA, ASSIGNOR TO JOSHUA DOOLY AND JAMES M. BOND, OF SAME PLACE, ONE-THIRD TO EACH.

IMPROVEMENT IN PLOWS.

Specification forming part of Letters Patent No. 210,548, dated December 3, 1878; application filed October 14, 1878.

*To all whom it may concern:*

Be it known that I, STEPHEN P. MCKINNY, of Barrettsville, in the county of Dawson and State of Georgia, have invented certain new and useful Improvements in Plows; and I do hereby declare that the following is a full, clear, and exact description thereof, which will enable others skilled in the art to which it appertains to make and use the same, reference being had to the accompanying drawings, which form a part of this specification, and in which—

Figure 1 is a side elevation of my improved plow. Fig. 2 is a rear elevation, and Fig. 3 is a front elevation, of the same.

The same part in the several figures is designated by the same letter.

This invention appertains to that class of plows operated by hand, and directly to the beam of which the draft is applied; and it consists in the combination, with the plow beam or beams, of pivoted notched standards, for supporting the shovels and adjustable hooked braces, which serve the double purpose of adjusting the angle of the standard and the depth of the plow or shovel affixed thereto, substantially as hereinafter more fully set forth.

In the drawings, A is the main beam, to the forward end of which the draft is immediately applied by suitable means. To the rear end of this beam are secured the handles B, by which the attendant or operator manages and guides the plow. From the same end of this beam is suspended the shovel or plow C by means of the standard D, preferably bifurcated, or made in two parallel pieces, secured together at their lower ends, and pivoted at their upper ends to the beam A, to enable them to have a limited movement, either forwardly or rearwardly, to aid in setting the plow or shovel so as to enter the ground a greater or less depth, or at a varying angle.

E is a brace, connecting the lower end of the standard D to the beam at a point a short distance beyond where its upper end is connected thereto. The upper end of this brace is hooked into a staple or loop, e, secured to the beam, while its opposite end is provided with a tooth or projection, f, which engages with downwardly-projecting teeth or notches g g on the standard. The hooked end f of the brace E has a straight shoulder, f', which will, when the brace is secured in position by means of the bolt h and nut i, (said bolt being inserted between the arms of the bifurcated standard,) serve as a support or shoulder, against which the upper straight edge of the shovel abuts, as shown in Fig. 1, the same bolt h and nut i answering the double purpose of preventing hook f from slipping out of the notch into which it is inserted, and as a stop for holding the share or shovel firmly in its position upon the standard.

To one side of the beam A is connected or hinged a supplemental beam, A', by the separated parallel bars or arms F, pivoted to the beam A at their inner ends, and at their outer ends to the beam A', so as to permit of the latter being swung forwardly or rearwardly. To the forward end of the beam A' is adjusted a bow or clip, G, by which it is connected to the same end of the beam A, so as to slide along the latter, and be retained in position as it is moved rearwardly or forwardly in adjusting its plow or shovel at a point forward or rearward of the plow or shovel of the main beam, as the case may require.

The beam A' is also supplied with a shovel or plow, both of which and the plow of the main beam are made reversible, to serve as right and left plows, which plow is connected, in all respects similarly to the plow of the main beam, to its beam by a standard, H.

This plow is exceedingly simple, cheap, and is easily constructed and operated.

Having thus described my invention, I claim and desire to secure by Letters Patent of the United States—.

In combination with the plow-beams A A' and pivoted standards D H, the adjustable braces E E', having hooked shoulders f, bolts h, and nuts i, whereby said hooked shoulders may be secured in the notches g of the standards, so as to form additional supports or abutments for the shares or shovels affixed upon the standards, substantially in the manner and for the purpose set forth.

In testimony that I claim the foregoing as my own I have hereunto affixed my signature in presence of two witnesses.

STEPHEN P. McKINNY.

Witnesses:
ELIAS P. BOND,
WILLIAM B. EDWARDS.